United States Patent [19]

Jablonsky

[11] 4,189,024
[45] Feb. 19, 1980

[54] AUXILIARY POWER STEERING FOR MOTOR VEHICLES

[75] Inventor: Erich Jablonsky, Boebingen, Fed. Rep. of Germany

[73] Assignee: Zahnradfabrik Friedrichshafen AG, Freidrichshafen, Fed. Rep. of Germany

[21] Appl. No.: 918,422

[22] Filed: Jun. 23, 1978

[51] Int. Cl.² ............................................. B62D 5/06
[52] U.S. Cl. ..................................... 180/133; 60/405; 91/375 A
[58] Field of Search ................... 180/133; 91/375 A; 60/403, 405; 417/2, 3

[56] References Cited

U.S. PATENT DOCUMENTS

| 3,602,327 | 8/1971 | Garrison | 180/133 |
|---|---|---|---|
| 3,822,759 | 7/1974 | Sheppard | 180/133 |
| 3,855,904 | 12/1974 | Jablonsky | 91/372 |
| 3,927,604 | 12/1975 | Jablonsky | 91/375 R |
| 3,939,757 | 2/1976 | Jablonsky | 91/375 A |
| 4,006,792 | 2/1977 | Bundschuh | 180/143 |
| 4,012,993 | 3/1977 | Jablonsky | 91/375 A |
| 4,114,720 | 9/1978 | Ericson et al. | 60/405 |

FOREIGN PATENT DOCUMENTS 1133642 7/1962 Fed. Rep. of Germany .......... 180/154

Primary Examiner—Joseph F. Peters, Jr.
Assistant Examiner—Randall A. Schrecengost
Attorney, Agent, or Firm—Zalkind & Shuster

[57] ABSTRACT

A dual hydraulic circuit arrangement is provided each comprising essential elements of an independent booster steering system, each having valving mechanisms for steering control wherein the valving mechanisms pressurize and exhaust the power cylinder of the respective circuit. The valving mechanisms are operable in a sequential order so that initially and ordinarily one power cylinder effects steering, but in the event of failure or very heavy requirement the second power cylinder is capable of operating the steering mechanism or of assisting in such operation. It is contemplated that the pump of the initially operative circuit is engine driven and the pump of the other or emergency circuit is driven by the vehicle wheels. Thus, in the event of vehicle engine failure, the emergency power circuit can effect steering as long as the vehicle is moving. On the other hand, when heavy steering load is encountered, as in parking, both circuits are operative.

11 Claims, 6 Drawing Figures

AUXILIARY POWER STEERING FOR MOTOR VEHICLES

Cross reference is made to the following patent applications:

Ser. No. 923,682, filed by Erich Jablonsky on July 11, 1978, for: Auxiliary Power Steering for Motor Vehicles;

Ser. No. 923,679, filed by Karl-Heinz Liebert on July 11, 1978 for: Hydrostatic Two-Circuit Steering Arrangement;

Ser. No. 935,947 filed by Werner Tischer on Aug. 23, 1978, for: Two Circuit Steering Arrangement for Motor Vehicles.

The preceding applications are all assigned to the assignee of this application.

The invention is particularly contemplated for heavy vehicles which could not as a practical matter be steered by manual force in the event of breakdown of a single booster steering system. Dual systems have previously been known, e.g., as shown in the U.S. patent to Sheppard, U.S. Pat. No. 3,822,759, and the art cited therein. In such instance both power cylinders are actuated engine driven pumps and both act simultaneously, each system providing 50% of the steering power normally used. Of course, if the vehicle engine fails there is no emergency backup power system.

In construction of the present invention there are combined a reciprocal valve mechanism essentially as known in the art, e.g., German Pat. No. 1,133,642, and various U.S. patents such as: U.S. Pat. Nos. 4,012,993; 3,939,757; 3,927,604; 3,855,904. In these constructions a spindle head sleeve has transverse bores which carry slidable valves actuated by driver pins carried by a steering spindle and utilizing a torque rod for return or centering movement of the steering spindle. This arrangement is utilized herein in combination with a rotary valve mechanism built into the spindle head sleeve and operated through a lost motion device by the steering spindle after initial actuation of the reciprocal valves. The rotary valve is of the general type exemplified in U.S. Pat. No. 4,006,792.

The reciprocal valves control steering via the power cylinder of a first hydraulic circuit isolated from a second hydraulic circuit in which the rotary valve is comprised and which valve advantageously utilizes a portion of the spindle head sleeve as a stator member, having a rotor member therein actuated via a lost motion mechanism.

Accordingly, the engine driven pump is first utilized to effect steering, but upon continued rotation, if need be, of the steering spindle the pump driven by the vehicle wheels becomes either the sole or an assisting steering force.

A detailed description of the invention now follows in conjunction with the appended drawing in which FIG. 1 is a longitudinal section showing the power cylinders and certain essential elements of the reciprocal and rotary valves for control of the power cylinders, with all valves in neutral position for straight ahead steering;

Figure 1:
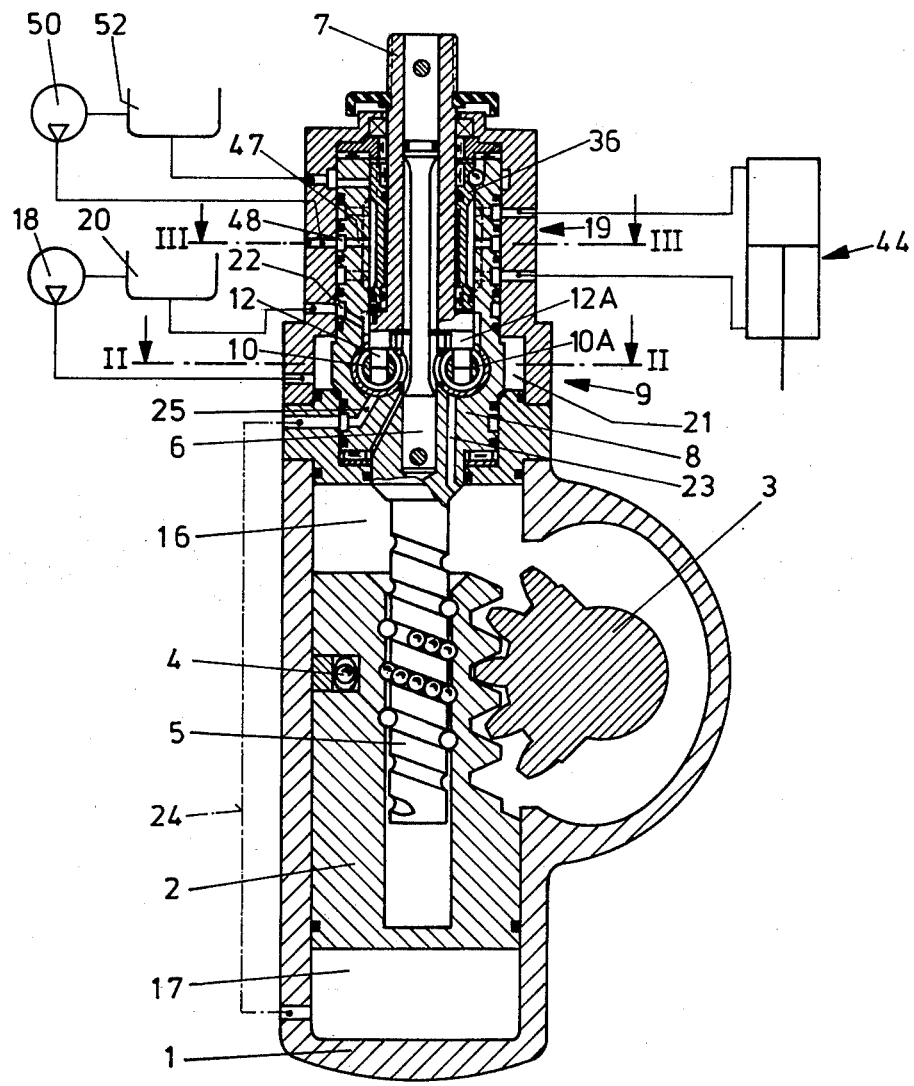
Figure 4:
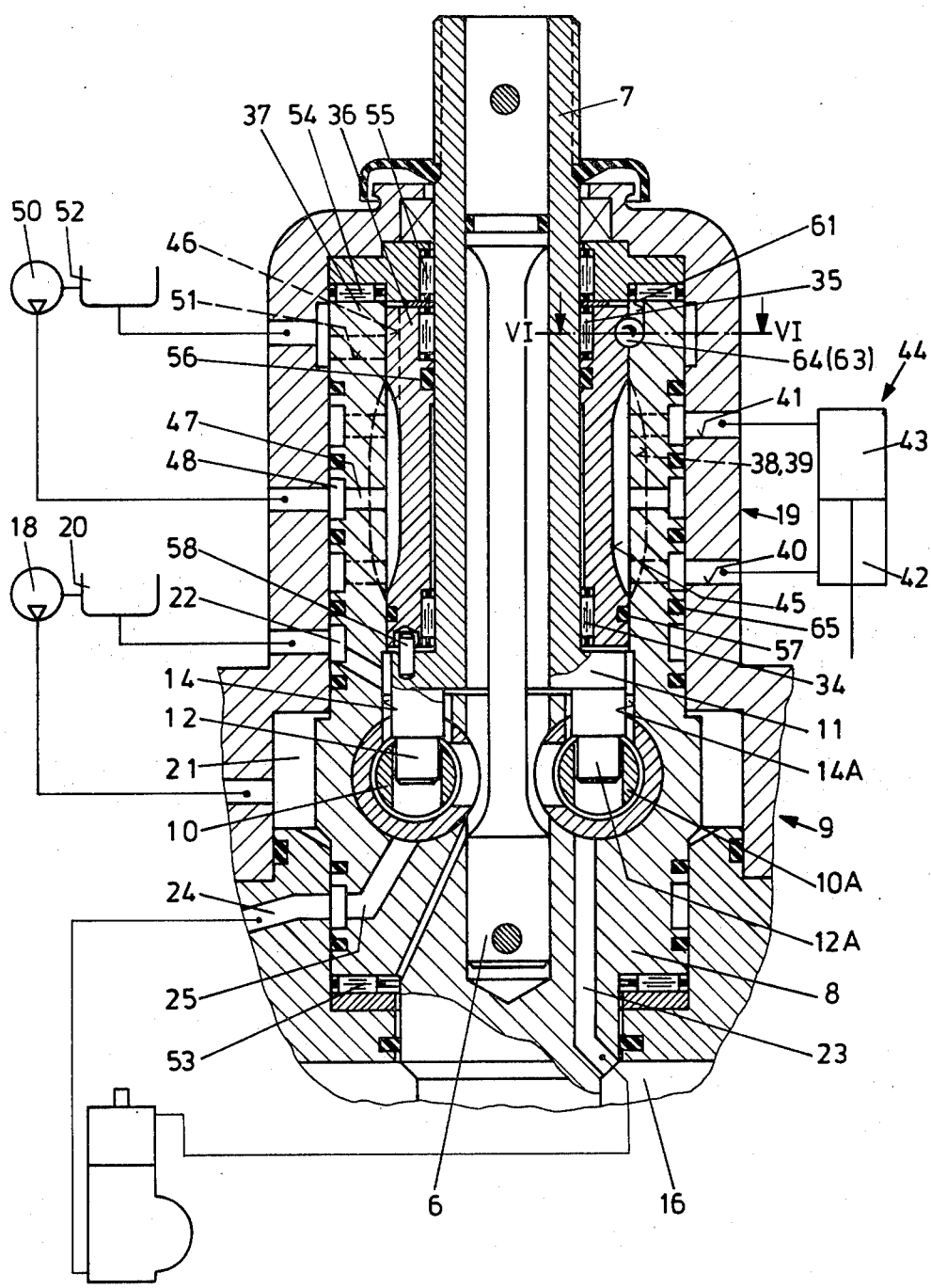
FIG. 4 is a longitudinal section to an enlarged scale of the rotary valve.

Referring to FIGS. 1 and 4, there is disclosed a housing with a piston 2 in a double-acting power cylinder 1 in the housing. The piston has a conventional internally threaded nut bore and a gear rack at one side engaging a gear sector 3 in the housing which will be understood to actuate a steering gear linkage by reciprocal motion of piston 2. The usual ball race 4 coacts with the threaded steering worm shaft 5 at the end of a spindle head sleeve 8, all in the conventional manner, connecting through a steering spindle return means such as a torque rod 6 to a steering spindle 7 understood to connect to a hand steering wheel, not shown. The encompassing spindle head sleeve 8 integral with and rotative with threaded shaft 5 carries transversely a steering control valve assembly 9, a valve means comprising reciprocal valves 10 and 10A in transverse bore means slidable in respective coacting valve sleeves fixed in sleeve 8 as shown. Respective actuating pins 12 and 12A carried on a flange 11 (FIG. 4) of the steering spindle 7 project through respective widened bore 14 and 14A in sleeve 8 for driving connection with respective valves 10 and 10A. It will be understood that manual steering wheel control of the valves 10 and 10A takes place through manual force by rotary movement of steering spindle 7 through torque rod 6 and the relative rotation thereby produced between members 7 and 8 although valves 10 and 10A are carried bodily by spindle sleeve 8.

Spindle head sleeve 8 has some frictional drag within the housing and with steering resistance permits twist of torque rod 6 to initially actuate the reciprocal valves of the first hydraulic circuit, serving as a reaction support. However, as subsequently explained, continued rotation of the hand steering wheel effects actuation of valving means of the second hydraulic circuit.

Figure 2:
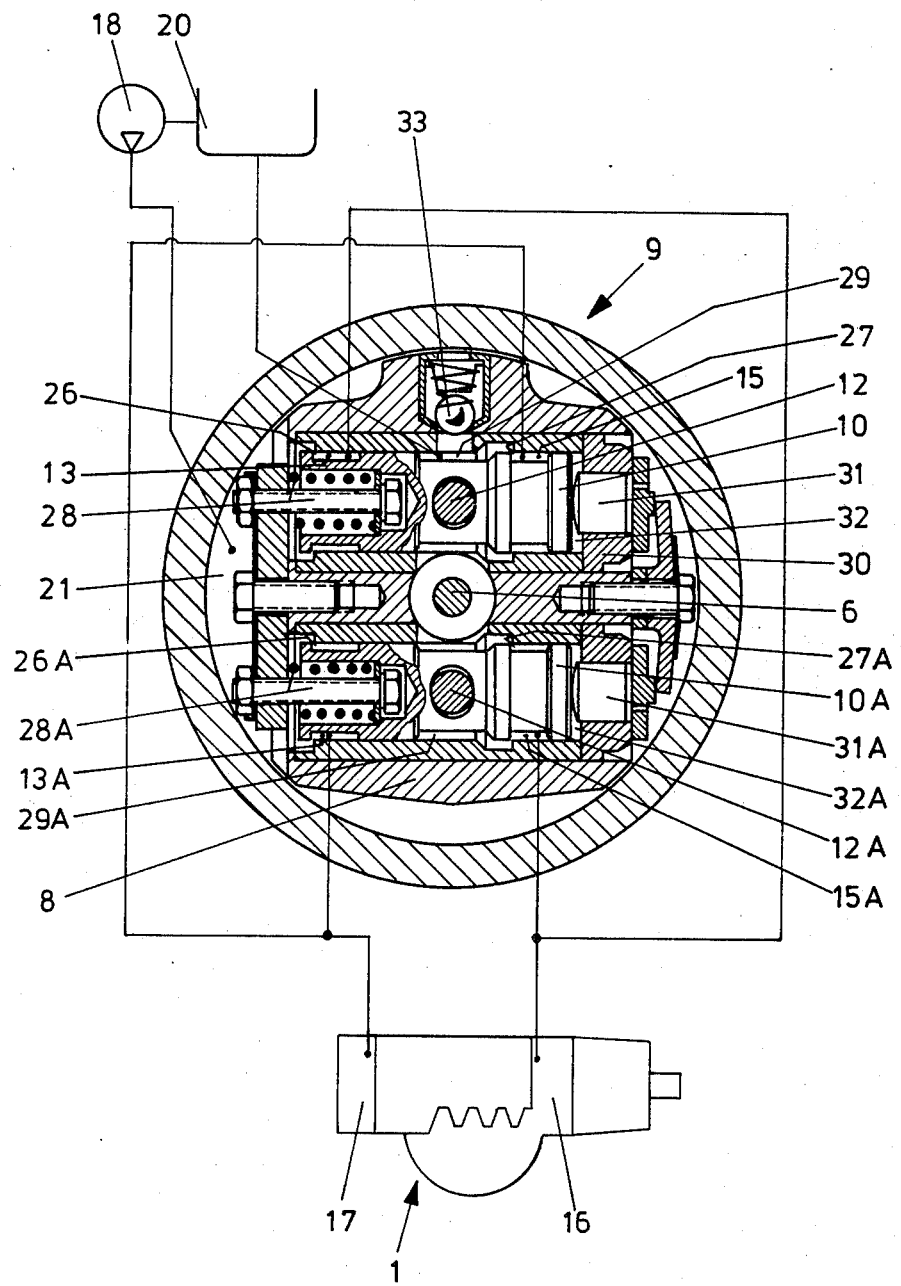
FIG. 2 is a section through II—II of FIG. 1 to an enlarged scale showing the reciprocal control valves for one power cylinder.

Reciprocation of these valves by relative rotation of the members 7 and 8 with respect to each other alternately opens or closes the valves 10 and 10A for pressurizing and exhausting the pressure chambers 16 and 17 of the double-acting cylinder in housing 1, wherein coaction of the valves and their sleeves effect open gaps at 26, 26A while closed at 27, 27A and vice versa, the flow being apparent from FIG. 2.

Thus, piston 2 divides housing 1 into pressure chambers 16 and 17 in the usual manner and the cylinder 1 forms a closed first hydraulic power steering circuit which comprises the engine driven pump 18, oil tank 20 and the valve assembly 9 (FIG. 4), namely, valves 10 and 10A comprised of valve cores and coacting sleeves of conventional construction. Pressure oil in this circuit is provided to annular chamber 21 in the housing which encompasses valve assembly 9, while exhaust flows via an annular groove 22 (FIG. 4) on the exterior of sleeve 8. The central grooves 29, 29A (FIG. 2) in the valve cores will be seen (FIG. 4) to communicate with a housing bore leading to groove 22 for exhaust connection. Pressure chamber 16 connects via means such as a channel 23 (FIG. 4) in the spindle head sleeve 8 for control of flow to and from pump 18. A housing channel 24 effects means to connect pressure chamber 17 (also see dash-dot line FIG. 1) with a channel 25 (FIG. 4) in spindle head sleeve 8 for fluid flow connection with valve 10 for pressurizing and exhaust. Thus, the channels 23 or 24 and 25, connecting to the respective pressure chambers 16 and 17 are connectible by the valve 10 with the annular exhaust flow groove 22 that communicates with tank 20.

Referring to FIG. 2, pump 18 furnishes pressure oil from tank 20 to the annular pressure chamber 21 surrounding the valve assembly 9 as will be understood from the foregoing. When the steering spindle 7 is rotated, the actuating pins 12 and 12A shift the respective valves 10 and 10A oppositely in respective directions dependent upon direction of rotation of the steering spindle, with a certain play determined by the diameter of the respective bores 14 and 14A (FIG. 4) provided in the sleeve 8. Accordingly, pressure oil in chamber 21 can flow to either pressure chamber 16 or 17 via a respective gap 26 or 26A, dependent upon the direction of movement of the respective valve 10 or 10A. If one pressure chamber is being pressurized, the other is being exhausted by way of a respective gap 27 or 27A either of which opens to permit flow to the respective groove 29 or 29A (FIG. 2) to the respective valves 10 and 10A back to tank 20 via groove 22 (FIG. 4) in spindle head sleeve 8.

In the neutral valve position for straight ahead steering as shown in FIG. 2 all control grooves, such as 13, 15, and 13A, 15A, machined into the piston type ends of the valve cores are open so that there is circulatory flow from pump 18 to tank 20. There is provided a centering mechanism such as 28 and 28A comprised of a bolt and respective compression spring to maintain the respective valve cores in central position, as well as providing a means for exact adjustment with reference to openable gaps at 26 and 26A. The centering means aids torque rod 6 in the event of returning of the valves to neutral positions. Such centering means is provided at corresponding ends of the valve cores while the other ends of the valve cores are closely fitted within the encompassing valve sleeves which form, with respective pistons 31 and 31A, respective reaction chambers 32 and 32A carried in a cover plate 30. These pistons are exposed to pump pressure at their outer ends through small ports as seen in FIG. 2. The reaction chambers connect via channels (not shown) with respective pressure chambers 16 and 17 in order to provide a reaction force against which the valve cores must be moved by manual force. This imparts a feeling of road resistance in the turning of a hand steering wheel. Should the reaction chambers be omitted, road resistance could still be simulated by the force necessary to twist the torque rod 6 and compress the springs of the centering mechanisms. Between the annular pressure chamber 21 and grooves 29 and 29A which connect with tank 20 a back pressure valve 33 is installed so that when the vehicle motor is not operating, oil can be sucked out of the housing to tank 20.

Figure 3:
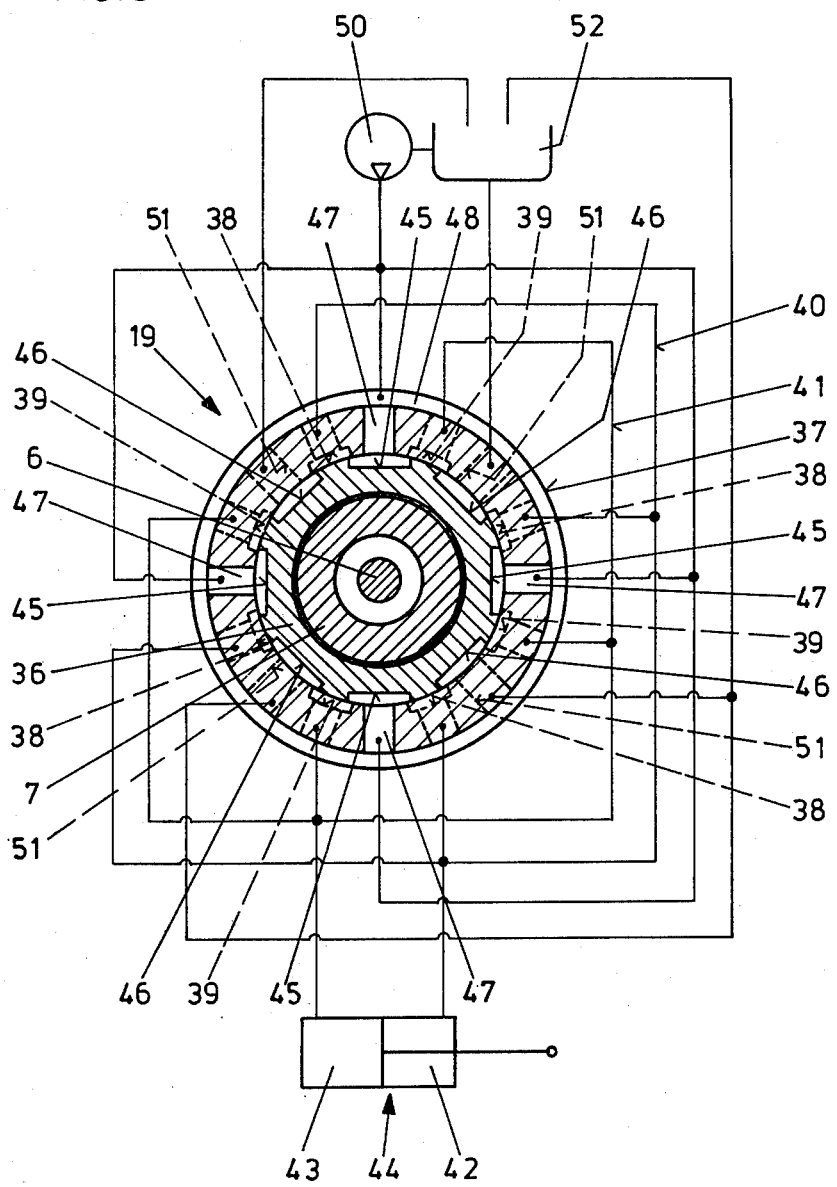
FIG. 3 is a section through III—III of FIG. 1 to an enlarged scale showing the rotary control valve for the other power cylinder.

As seen in FIGS. 1, 3 and 4, spindle head sleeve 8 is part of a rotary valve means assembly 19 comprising a rotary valve member 36 within spindle head sleeve 8, supported by needle bearings 34 and 35 on steering spindle 7, such bearings allowing steering spindle sleeve 7 to rotate without rotating member 36 for initial actuation of reciprocal valves 10, 10A but without actuating rotary valve mechanism 19 which is a subsequent actuation for control of the second hydraulic circuit involving pump 50. Spindle head sleeve 8 is provided with a rotary valve sleeve member 37 in the integral portion encompassing rotary valve 36 and has suitable grooving and passages to coact with the grooving of rotary valve member 36 for pressurizing and exhausting of an additional double-acting power cylinder 44 of the second hydraulic steering circuit. The members 36 and 37 effect a valving coaction constituting a known rotary valve means construction for pressurizing and exhausting double-acting cylinders, longitudinal grooves 38 and 39 (FIGS. 3 and 4) being cut into the wall of rotary valve member 37 and connect in alternating succession via respective passages 40 and 41 with respective pressure chambers 42 and 43 of the second power cylinder 44, as indicated on FIG. 3. On the outer wall of rotary valve 36 axial longitudinal grooves 45 and 46 are provided. Grooves 45 connect via channels 47 and an annular groove 48 with pump 50 which pressurizes the hydraulic circuit of power cylinder 44. The longitudinal grooves 46 connect via channels 51 with oil tank 52 of the second hydraulic circuit. Accordingly, the valve assembly 19 comprising rotary valve members 36, 37, double acting motor 44, pump 50 and tank 52 constitute a totally separate hydraulic circuit.

Upon rotation of the rotary valve 36 relative its coacting member 37, longitudinal grooves 45, 46 and 38, 39 shown in neutral position (FIG. 3) take a relative position such that one or the other of the pressure chambers 42 and 43 connects with output from pump 50, and in such case the opposite pressure chamber connects with the tank, depending upon direction or rotation of the hand steering wheel.

As seen in FIG. 4, axial bearings 53 and 54 support thrust force of spindle head sleeve 8 while a radial bearing 55 supports rotary forces of steering spindle 7. The two hydraulic circuits are sealed from each other by gaskets 56, 65 and 57.

Figure 5:
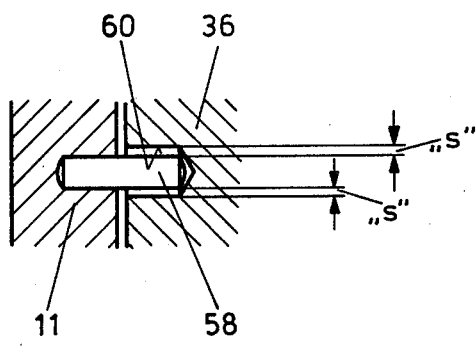
FIG. 5 is a section of a detail of FIG. 4 showing an interconnecting drive pin between the reciprocal and rotary valves; and, FIG. 6 is a fragmentary section through VI—VI of FIG. 4.
Figure 6:
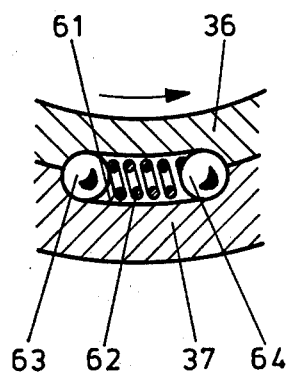

A drive pin 58 is carried in flange 11 of steering spindle 7 and engages with a predetermined degree of lost motion connection or play "s" (FIG. 5) in a bore 60 of rotary valve member 36. The play is made larger than the designed amount of opening of the valving gaps 26, 27, 26A and 27A of the valves 10, 10A (FIG. 2). A centering mechanism (FIG. 6) effected by a compression spring 62 and balls 63 and 64 at the ends thereof is carried in a composite arcuate cavity 61 comprised of mating recesses as shown provided in the contiguous walls of valve member portion 37 of spindle head sleeve 8 and rotary valve member 36. Engagement of a ball with the respective recess ends will compress the spring on bidirectional relative rotation to return the centered position of member 36.

When steering spindle 7 is rotated only the valve control assembly 9 is initially actuated so that only the first hydraulic steering circuit comprising double acting cylinder 1, pump 18 and tank 20 is utilized to actuate a steering linkage of the vehicle (not shown). Since the moving parts have needle bearings 34 and 35, there is very little friction as compared to the friction existing between the relatively rotative members 36 and 37, and thus the rotary valve is not initially actuated by the initial rotary movement of steering spindle 7. However, as manual force on the steering wheel increases with increased steering resistance, for example, should there be failure of the first hydraulic steering circuit involving the cylinder 1, the drive pin 58 carried by steering spindle 7 will rotate valve member 36 relative to member 37 so that the second steering hydraulic circuit comprised of power cylinder 44, pump 50 and tank 52, comes into action. At this time, member 36, rotating, say, in the direction of the arrow of FIG. 6 relative to member 37, will drive ball 63 to compress spring 62 thus storing up energy to return members 36 and 37 back to neutral position upon release of hand force acting on the steering wheel. Thus centering force is in the same direction as return to neutral provided by torque rod 6 and centering mechanisms 28 and 28A.

In actual practice, if pump 18 is driven by the engine of the vehicle and the pump 50 by the wheels of the vehicle, should the vehicle engine fail whereby pump 18 is no longer power driven, or should a break in the pressure line occur, the second hydraulic steering circuit comprising pump 50 remains intact and operable as long as the vehicle is moving. Accordingly, even with the first hydraulic steering circuit inoperative, the vehicle may still be safely steered provided by pump 50 of the second hydraulic steering system which is actuated by the wheels of the vehicle and, of course, the momentum of the vehicle provides pump power until the vehicle comes to a stop.

In operation, the first hydraulic steering system involving pump 18 is the one generally relied on and the second hydraulic steering system involving pump 50 is an emergency installation operable as long as the vehicle is moving. Pump 18 must, of course, be of sufficiently large design so as to be operable during parking. Were a small pump 18 to be used, an additional force would have to be applied by the strength of the vehicle operator, inasmuch as pump 50 is operative only while the vehicle is traveling. Further, in the event of an increased requirement for steering power over and above that provided by pump 18, it is possible to add the power of pump 50 by continued rotation of the hand steering wheel so as to actuate the rotary valve assembly via pin 58, as long as the vehicle is moving.

What is claimed is:

1. In a dual power steering system comprising separate first and second hydraulic circuits each of which comprises a pump with a respective drive therefore, a double acting power cylinder, and a valving means for controlling pressure and exhaust flow to and from the power cylinder;
   including flow communication passages in each hydraulic circuit connecting the pump, power cylinder and valving means thereof for operation in vehicle steering; the improvement of which comprises:
   a housing for both said valving means, a manually operable steering spindle extending into said housing and connected to initially actuate the valving means of the first hydraulic circuit;
   and drive means interconnecting said steering spindle with the second hydraulic circuit valving means for actuation thereof upon predetermined degree of operation of said steering spindle subsequent to actuation of said valving means of said first hydraulic circuit.

2. In a dual power steering system as set forth in claim 1, wherein the pump of said first hydraulic circuit is driven by a vehicle engine and the pump of said second hydraulic circuit is driven from the vehicle wheels.

3. In a dual power steering system as set forth in claim 1, said first hydraulic circuit valving means comprising a reciprocal valve mechanism and said second hydraulic circuit valving means comprising a rotary valve mechanism coaxial with said steering spindle and said drive means being a lost motion drive connection therewith.

4. In a dual power system as set forth in claim 3, a spindle head sleeve within said housing, both said valving means being carried within said sleeve and said steering spindle extending coaxially and rotationally into said spindle head sleeve;
   steering spindle return means connected to said steering spindle and to said spindle head sleeve;
   drive means (12, 12A) intermediate said steering spindle and said reciprocal valves and means providing reaction support against rotation of said spindle head sleeve upon initial rotation of said steering spindle whereby said steering spindle can initially actuate said reciprocal valves for control of said first hydraulic circuit without actuation of said rotary valve mechanism;
   whereupon continued rotation of said steering spindle effects subsequent actuation of said rotary valve mechanism.

5. In a dual power system as set forth in claim 1,
   the valving means for said first hydraulic circuit comprising a pair of reciprocal valve mechanisms initially actuatable by said steering spindle;
   said valving means for said second hydraulic circuit comprising a rotary valve mechanism and means whereby said rotary valve mechanism is subsequently actuatable by said steering spindle.

6. In a dual power system as set forth in claim 5, wherein said rotary valve mechanism comprises a spindle head sleeve in said housing;
   said steering spindle extending coaxially into said spindle head sleeve;
   said spindle head sleeve having a transverse bore means and said reciprocal valve mechanism comprising valve means slidable therein for flow control of said first hydraulic circuit and
   said steering spindle having drive pins engageable therewith for initial actuation thereof;
   said rotary valve means comprising a rotary valve member provided with flow control passages and rotative within said spindle head sleeve and means engageable intermediate said steering spindle and said rotary valve member for subsequent actuation thereof after a predetermined degree of actuation of said reciprocal valve means;
   said spindle head sleeve having passages coacting with said rotary valve member passages to effect said rotary valve mechanism for flow control of said second hydraulic circuit.

7. In a dual power steering system as set forth in claim 6, said valve means comprising a pair of reciprocal valves, each reciprocal valve being in a respective bore;
   said bores being closed at one end to effect reaction chambers;
   and each said reciprocal valve having a centering means at the other end of the respective bore.

8. In a dual power steering system as set forth in claim 1,
   a spindle head sleeve within said housing and said steering spindle extending coaxially thereinto;
   a rotary valve member encompassing said steering spindle;
   said rotary valve member and said spindle head sleeve having coacting valving passages so as to effect a rotary valve for the valving means of said second hydraulic circuit.

9. In a dual power steering system as set forth in claim 8, said spindle head sleeve extending into the power cylinder of said first hydraulic cylinder;

said power cylinder having a piston and said spindle head sleeve having a spindle shaft having threaded coaction with said piston;

reciprocal valves carried in respective bores of said spindle head sleeve and said bores having means effecting flow passage coaction with the respective reciprocal valves wherein gaps are opened or closed by actuation of said reciprocal valves for steering control flow passage;

a lost motion connection between said steering spindle and said rotary valve member having an extent of lost motion larger than the extent of opening of said gaps.

10. In a dual power steering system as set forth in claim 8, including a centering device intermediate said spindle head sleeve and said rotary valve member comprising a pair of mating recesses formed in contiguous walls to effect a cavity;

a ball at each end of said cavity and a compression spring therebetween biasing each ball to engage the respective ends of the recesses so that relative bidirectional rotation between said spindle head sleeve and said rotary member will move a respective ball to compress said spring for biasing said spindle head sleeve and said rotary member to return to centered position.

11. In a dual power steering system as set forth in claim 9, including bearings intermediate said rotary valve member and said steering spindle to enhance initial actuation of said reciprocal valves without rotation of said rotary valve member.

* * * * *